(12) United States Patent
Kim et al.

(10) Patent No.: US 11,379,149 B2
(45) Date of Patent: Jul. 5, 2022

(54) MEMORY DEVICE INCLUDING A PROCESSING CIRCUIT, MEMORY CONTROLLER CONTROLLING THE MEMORY DEVICE AND MEMORY SYSTEM INCLUDING THE MEMORY DEVICE

(71) Applicants: SK hynix Inc., Icheon (KR); Korea University Research and Business Foundation, Seoul (KR)

(72) Inventors: Seon Wook Kim, Namyangju (KR); Wonjun Lee, Seoul (KR); Changhyun Kim, Seongnam (KR)

(73) Assignees: SK HYNIX INC., Icheon (KR); KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 285 days.

(21) Appl. No.: 16/711,274

(22) Filed: Dec. 11, 2019

(65) Prior Publication Data
US 2020/0356305 A1 Nov. 12, 2020

(30) Foreign Application Priority Data
May 10, 2019 (KR) .................. 10-2019-0054844

(51) Int. Cl.
*G06F 3/06* (2006.01)
*G06F 13/16* (2006.01)
(Continued)

(52) U.S. Cl.
CPC .......... *G06F 3/0659* (2013.01); *G06F 3/0604* (2013.01); *G06F 3/0656* (2013.01);
(Continued)

(58) Field of Classification Search
CPC .... G06F 3/0659; G06F 3/0604; G06F 3/0656; G06F 3/0672; G06F 7/5443; G06F 7/57; G06F 13/1668
See application file for complete search history.

(56) References Cited

U.S. PATENT DOCUMENTS 9,997,232 B2     6/2018  Murphy
10,437,482 B2 * 10/2019  Chang .................. G06F 3/0653
10,592,121 B2 *  3/2020  Malladi ................ G06F 3/068

OTHER PUBLICATIONS

Aapo Kyrola et al., "GraphChi: Large-scale Graph Computation on Just a PC", in Proceedings of the 10th USENIX Conference on Operating Systems Design and Implementation, OSDI'12, pp. 31-46, Oct. 2012.

(Continued)

*Primary Examiner* — Idriss N Alrobaye
*Assistant Examiner* — Richard B Franklin

(57) ABSTRACT

A semiconductor device may include a memory controller, which may include a request queue storing requests. Requests include a memory request including a read request to a memory device or a write request to the memory device, and a process in memory (PIM) request requesting a processing operation in the memory device. The memory controller may also include a command generator configured to generate a memory command from a memory request output from the request queue and to generate a PIM command from a PIM request output from the request queue, a command queue storing a memory command and a PIM command output from the command generator, and a command scheduler configured to control output order, output timing, or both of a memory command and a PIM command stored in the command queue.

23 Claims, 12 Drawing Sheets

(51) Int. Cl.
  *G06F 7/57* (2006.01)
  *G06F 7/544* (2006.01)
(52) U.S. Cl.
  CPC .......... *G06F 3/0673* (2013.01); *G06F 7/5443* (2013.01); *G06F 7/57* (2013.01); *G06F 13/1668* (2013.01)

(56) References Cited

OTHER PUBLICATIONS

Ali Shafiee et al., "ISAAC: A Convolutional Neural Network Accelerator with In-situ Analog Arithmetic in Crossbars", in Proceedings of the 43rd International Symposium on Computer Architecture, ISCA '16, pp. 14-26, Jun. 2016.
Amin Farmahini-Farahani et al., "NDA: NearDRAM acceleration architecture leveraging commodity DRAM devices and standard memory modules", in Proceedings of the 21st International Symposium on High Performance Computer Architecture, HPCA' 15, pp. 283-295, Feb. 2015.
Aniruddha N. Udipi et al., "Rethinking dram design and organization for energy-constrained multi-cores", in Proceedings of the 37th Annual International Symposium on Computer Architecture, ISCA '10, pp. 175-186, 2010.
Charles Lefurgy et al., "Energy management for commercial servers", IEEE Computer, vol. 36, pp. 39-48, Dec. 2003.
Cristian Diaconu et al., "Hekaton: SQL Server's Memoryoptimized OLTP Engine", in Proceedings of the 2013 ACM SIGMOD International Conference on Management of Data, SIGMOD '13, pp. 1243-1254, Jun. 2013.
Daichi Fujiki et al., "In-Memory Data Parallel Processor", in Proceedings of the 23rd International Conference on Architectural Support for Programming Languages and Operating Systems, ASPLOS '18, pp. 1-14, Mar. 2018.
Dong Uk Lee et al., "25.2 A 1.2V 8Gb 8-channel 128GB/s high-bandwidth memory (HBM) stacked DRAM with effective microbump I/O test methods using 29nm process and TSV", in Proceedings of the 2014 IEEE International Solid-State Circuits Conference Digest of Technical Papers, ISSCC' 14, pp. 432-433, Feb. 2014.
G. E. Hinton et al., "Improving neural networks by preventing co-adaptation of feature detectors", CoRR, vol. abs/1207.0580, 2012.
H.-S. Philip Wong et al., "Metal-Oxide RRAM", Proceedings of the IEEE, vol. 100, pp. 1951-1970, Jun. 2012.
Hybrid Memory Cube Consortium, "Hybrid Memory Cube Specification 2.1", tech. rep., 2014.
Hyunsung Shin et al., "McDRAM: Low latency and energy-efficient matrix computations in dram", IEEE Transactions on Computer-Aided Design of Integrated Circuits and Systems, vol. 37, pp. 2613-2622, Nov. 2018.
Ilie Tanase et al., "A Highly Efficient Runtime and Graph Library for Large Scale Graph Analytics", in Proceedings of Workshop on GRAph Data Management Experiences and Systems, GRADES'14, pp. 1-6, Jun. 2014.
Inho Park et al., "The distributed virtual shared-memory system based on the infiniband architecture", Journal of Parallel and Distributed Computing, vol. 65, No. 10, pp. 1271-1280, 2005. Design and Performance of Networks for Super-, Cluster-, and Grid-Computing Part I.
Jin Hee Cho et al., "A 1.2V 64Gb 341GB/S HBM2 stacked DRAM with spiral point-to-point TSV structure and improved bank group data control", in Proceedings of the 2018 IEEE International Solid-State Circuits Conference Digest of Technical Papers, ISSCC' 18, pp. 208-210, Feb. 2018.
Joe Jeddeloh et al., "Hybrid memory cube new DRAM architecture increases density and performance", in Proceedings of the 2012 Symposium on VLSI Technology, VLSIT' 12, pp. 87-88, Jun. 2012.
John L. Henning, "SPEC CPU2006 benchmark descriptions", SIGARCH Computer Architecture News, vol. 34, pp. 1-17, Sep. 2006.

John Von Neumann, "First draft of a report on the edvac", IEEE Annals of the History of Computing, vol. 15, pp. 27-75, Oct. 1993.
Joseph E. Gonzalez et al., "Powergraph: Distributed graph-parallel computation on natural graphs", in Proceedings of the 10th USENIX Conference on Operating Systems Design and Implementation, OSDI'12, pp. 17-30, Oct. 2012.
Junwhan Ahn et al., "A Scalable Processing-in-memory Accelerator for Parallel Graph Processing", in Proceedings of the 42nd Annual International Symposium on Computer Architecture, ISCA '15, pp. 105-117, Jun. 2015.
Junwhan Ahn et al., "PIM-enabled Instructions: A Low-overhead, Locality-aware Processing-in-memory Architecture", in Proceedings of the 42nd Annual International Symposium on Computer Architecture, ISCA '15, pp. 336-348, Jun. 2015.
Karthik Chandrasekar et al., "Improved Power Modeling of DDR SDRAMs", in Proceedings of the 14th Euromicro Conference on Digital System Design, DSD' 11, pp. 99-108, Aug. 2011.
Kevin Hsieh et al., "Transparent Offloading and Mapping (TOM): Enabling Programmer-transparent Near-data Processing in GPU Systems", in Proceedings of the 43rd International Symposium on Computer Architecture, ISCA '16, pp. 204-216, Jun. 2016.
Kibong Koo et al., "A 1.2V 38nm 2.4Gb/s/pin 2Gb DDR4 SDRAM with bank group and X4 half-page architecture", in Proceedings of the 2012 IEEE International Solid-State Circuits Conference, ISSCC' 12, pp. 40-41, Feb. 2012.
Lifeng Nai et al., "GraphBIG: Understanding Graph Computing in the Context of Industrial Solutions", in Proceedings of the International Conference for High Performance Computing, Networking, Storage and Analysis, SC '15, pp. 69:1-69:12, Nov. 2015.
Lifeng Nai et al., "GraphPIM: Enabling Instruction-Level PIM Offloading in Graph Computing Frameworks", in Proceedings of the 23rd International Symposium on High Performance Computer Architecture, HPCA' 17, pp. 457-468, Feb. 2017.
M. Prezioso et al., "Training and Operation of an Integrated Neuromorphic Network Based on Metal-Oxide Memristors", Nature, vol. 521, pp. 61-64, Dec. 2014.
Mary Hall et al., "Mapping Irregular Applications to DIVA, a PIM-based Dataintensive Architecture", in Proceedings of the 1999 ACM/IEEE Conference on Supercomputing, SC '99, Oct. 1999.
Matthieu Courbariaux et al., "Low precision arithmetic for deep learning", CoRR, vol. abs/1412.7024, Dec. 2014.
Mingyu Gao et al., "Practical near-data processing for in-memory analytics frameworks", in Proceedings of the 13th International Conference on Parallel Architecture and Compilation, PACT '15, pp. 113-124, Oct. 2015.
Mingyu Gao et al., "TETRIS: Scalable and Efficient Neural Network Acceleration with 3D Memory", in Proceedings of the 22nd International Conference on Architectural Support for Programming Languages and Operating Systems, ASPLOS '17, pp. 751-764, Apr. 2017.
Patrick Judd et al., "Stripes: Bit-serial Deep Neural Network Computing", in Proceedings of the 49th Annual IEEE/ACM International Symposium on Microarchitecture, MICRO' 16, pp. 1-12, Oct. 2016.
Paul Rosenfeld et al., "DRAMSim2: A Cycle Accurate Memory System Simulator", IEEE Computer Architecture Letters, vol. 10, pp. 16-19, Jan. 2011.
Peter Boncz et al., "MonetDB/XQuery: A Fast XQuery Processor Powered by a Relational Engine", in Proceedings of the 2006 ACM SIGMOD International Conference on Management of Data, SIGMOD '06, pp. 479-490, Jun. 2006.
Ping Chi et al., "PRIME: A Novel Processing-in-Memory Architecture for Neural Network Computation in ReRAM-Based Main Memory", in Proceeding of the 43rd Annual International Symposium on Computer Architecture, ISCA '16, pp. 27-39, Jun. 2016.
Robert Kallman et al., "H-store: A High-performance, Distributed Main Memory Transaction Processing System", Proceedings of the VLDB Endowment, vol. 1, pp. 1496-1499, Aug. 2008.
S. Rakesh et al., "A survey on the design and performance of various MAC unit architectures", in Proceedings of the 2017 IEEE International Conference on Circuits and Systems, ICCS' 17, pp. 312-315, Dec. 2017.

(56) References Cited

OTHER PUBLICATIONS

SK Hynix, "DDR4 SDRAM device operation". https://www.skhynix.com/ static/filedata/fileDownload.do?seq=253. accessed: Dec. 6, 2018.

Song Han et al., "Eie: Efficient inference engine on compressed deep neural network", in Proceedings of the 43rd International Symposium on Computer Architecture, ISCA '16, pp. 243-254, Jun. 2016.

Stephen W. Keckler et al., "GPUs and the Future of Parallel Computing", IEEE Micro, vol. 31, pp. 7-17, Sep. 12, 2011 vol. 4, 2016 Author et al.: Preparation of Papers for IEEE Transactions and Journals.

Tianshi Chen et al., "Diannao: A small-footprint high-throughput accelerator for ubiquitous machine-learning", in Proceedings of the 19th International Conferenceon Architectural Support for Programming Languages and Operating Systems, ASPLOS '14, pp. 269-284, Mar. 2014.

Wm. A. Wulf et al., "Hitting the Memory Wall: Implications of the Obvious", tech. rep., Charlottesville, VA, USA, 1994.

Yann Lecun et al., "Deep learning", Nature, vol. 521, pp. 436-444, May 2015.

Yi Kang et al., "FlexRAM: toward an advanced intelligent memory system", in Proceedings 1999 IEEE International Conference on Computer Design, ICCD '99, pp. 192-201, Oct. 1999.

Yong-Bin Kim et al., "Assessing merged DRAM/logic technology", in Proceedings of the 1996 IEEE International Symposium on Circuits and Systems, ISCAS' 96, pp. 133-136, May 1996.

Yoongu Kim et al., "Ramulator: A fast and extensible dram simulator", IEEE Computer Architecture Letters, vol. 15, pp. 45-49, Jan. 2016.

Yu-Hsin Chen et al., "Eyeriss: A spatial architecture for energy-efficient dataflow for convolutional neural networks", in Proceedings of the 43rd International Symposium on Computer Architecture, ISCA '16, pp. 367-379, Jun. 2016.

Yucheng Low et al., "Distributed graphlab: A framework for machine learning and data mining in the cloud", Proceedings of the VLDB Endowment, vol. 5, pp. 716-727, Apr. 2012.

Yunji Chen et al., "Dadiannao: A machine-learning supercomputer", in Proceedings of the 47th Annual IEEE/ACM International Symposium on Microarchitecture, MICRO' 14, pp. 609-622, Dec. 2014.

Maya Gokhale et al., "Processing in Memory: The Terasys Massively Parallel PIM Array", Computer, vol. 28, pp. 23-31, Apr. 1995.

\* cited by examiner

FIG. 5

| TYPE | OPCODE | | SRC | DST | OPERATION |
|---|---|---|---|---|---|
| PIM RD | PRD (010) | | BANK (00) | BUF0 (10) | READ: BUF0 ← BANK |
| | | | BANK (00) | BUF1 (11) | READ: BUF1 ← BANK |
| | | | SBUS (01) | BUF0 (10) | READ: BUF0 ← SBUS |
| | | | SBUS (01) | BUF1 (11) | READ: BUF1 ← SBUS |
| | CLR (000) | | BUF0 | BUF1 | vACC | rACC | Clear Register(s) of corresponding bit(s) |
| | MAC (100) | | (XX) | (XX) | vACC[i] ← vACC[i] + BUF0[i] x BUF1[i] |
| | RADD (110) | | (0X) | (XX) | rACC[i] ← reduce(+) from vACC |
| | | | (1X) | (XX) | rACC[i] ← rACC[i] + SBUS[j] |
| PIM WR | PWR (001) | | vACC (10) | BANK (00) | WRITE: vACC → BANK |
| | | | rACC (11) | BANK (00) | WRITE: rACC → BANK |
| | | | vACC (10) | SBUS (01) | WRITE: vACC → SBUS |
| | | | rACC (11) | SBUS (01) | WRITE: rACC → SBUS |

FIG. 10

| | | OPCODE | SRC | DST |
|---|---|---|---|---|
| ① PIM RD | CLR | 000 | xx | xx |
| ② PIM RD | PRD | 010 | 00 | 10 |
| ③ PIM RD | PRD | 010 | 00 | 11 |
| ④ PIM RD | MAC | 100 | xx | xx |
| ⑤ PIM RD | RADD | 110 | 0x | xx |
| ⑥ PIM WR | PWR | 001 | 11 | 01 |

FIG. 11

| | OPCODE | SRC | DST | |
|---|---|---|---|---|
| ① PIM RD | 000 | xx | xx | CLR |
| ② PIM RD | 010 | 00 | 10 | PRD |
| ③ PIM RD | 010 | 00 | 11 | PRD |
| ④ PIM RD | 100 | xx | xx | MAC |
| ⑤ PIM RD | 110 | 0x | xx | RADD |
| ⑦ PIM RD | 110 | 1x | xx | RADD |
| ⑥ PIM WR | 001 | 11 | 01 | PWR |

FIG. 12

| | OPCODE | SRC | DST |
|---|---|---|---|
| ① PIM RD  CLR | 000 | xx | xx |
| ② PIM RD  PRD | 010 | 00 | 10 |
| ③ PIM RD  PRD | 010 | 00 | 11 |
| ④ PIM RD  MAC | 100 | xx | xx |
| ⑤ PIM RD  RADD | 110 | 0x | xx |
| ⑦ PIM RD  RADD | 110 | 1x | xx |
| ⑧ PIM WR  PWR | 001 | 11 | 00 |

MEMORY DEVICE INCLUDING A PROCESSING CIRCUIT, MEMORY CONTROLLER CONTROLLING THE MEMORY DEVICE AND MEMORY SYSTEM INCLUDING THE MEMORY DEVICE

CROSS-REFERENCE TO RELATED APPLICATIONS

The present application claims priority under 35 U.S.C. § 119(a) to a Korean Patent Application No. 10-2019-0054844, filed on May 10, 2019, which are incorporated herein by reference in its entirety.

BACKGROUND

1. Technical Field

Embodiments relate to a memory device including a processing circuit, a memory controller for controlling the memory device, and a memory system including the memory device. More particularly, embodiments include a memory device capable of performing a general memory read or write operation during a processing operation, a memory controller for controlling the memory device, and a memory system including the memory device.

2. Related Art

Processing-in-memory (PIM) technology is being developed to perform processing operations within a memory device.

Conventional PIM technology is limited to a specific application based on a 3D stacked memory device such as a Hyper Memory Cube (HMC) or a High Bandwidth Memory (HBM), or has been developed as an accelerator in a Dynamic Random Access Memory (DRAM) device.

In a memory device adopting conventional PIM technology, a general memory read and write operations cannot be performed during a processing operation, and accordingly the performance of the memory system deteriorates.

SUMMARY

In accordance with the present teachings, a memory controller according to an embodiment may include a request queue storing a memory request including a read request to a memory device and a write request to the memory device and a process in memory (PIM) request to require a processing operation in the memory device; a command generator configured to generate a memory command from a memory request output from the request queue and to generate a PIM command from a PIM request output from the request queue; a command queue storing a memory command and a PIM command output from the command generator; and a command scheduler configured to control output order or output timing of a memory command and a PIM command stored in the command queue.

In accordance with the present teachings, a memory device according to an embodiment may include a command decoder configured to decode a memory command representing a read or a write operation in the memory device and decode a PIM command representing a processing operation in the memory device; a bank to store data; an input/output (IO) buffer configured to input or output data; a shared bus configured to transfer data between the bank and the IO buffer; and a processing circuit configured to be connected with the shared bus and the bank and to perform a processing operation according to a control by the command decoder, wherein the bank is controlled by the command decoder to perform a memory command while the processing circuit performs a processing operation by a PIM command.

In accordance with the present teachings, a memory system according to an embodiment may include a memory device and a memory controller. The memory controller may be configured to generate a memory command from a memory request including a read request and a write request for the memory device, to generate a PIM command from a PIM request requiring a processing operation in the memory device, and to schedule the PIM command together with the memory command, wherein the memory device performs data read or data write operation according to a memory command from the memory controller and performs a processing operation according to a PIM command from the memory controller, and wherein the memory device performs the data read or data write operation while the memory device performs the processing operation.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed novelty, and explain various principles and advantages of those embodiments.

FIG. 5 shows a table illustrating PIM commands according to an embodiment of the present disclosure.

FIGS. 10, 11, and 12 illustrate respective PIM operations according to an embodiment of the present disclosure.

DETAILED DESCRIPTION

The following detailed description references the accompanying figures in describing illustrative embodiments consistent with this disclosure. The embodiments are provided for illustrative purposes and are not exhaustive. Additional embodiments not explicitly illustrated or described are possible. Further, modifications can be made to presented embodiments within the scope of the present teachings. The detailed description is not meant to limit this disclosure. Rather, the scope of the present disclosure is defined in accordance with the presented claims and equivalents thereof.

Figure 1:
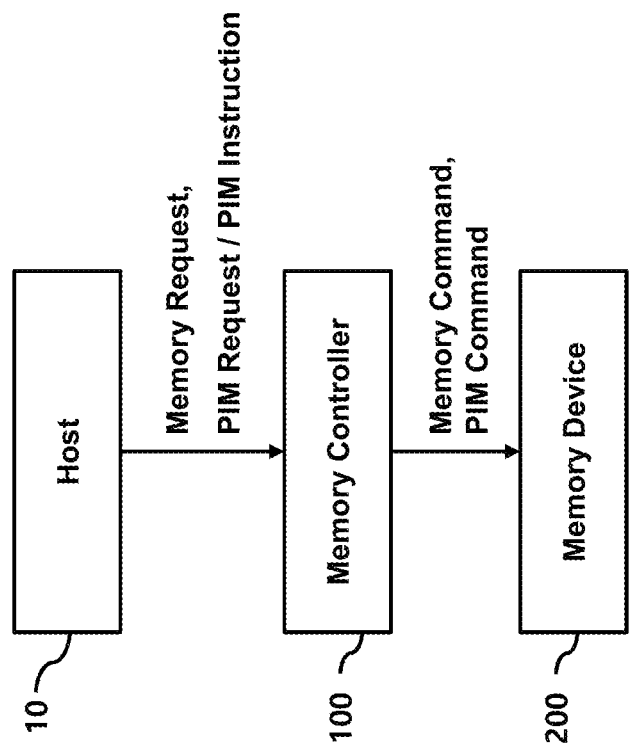
FIG. 1 illustrates a memory system according to an embodiment of the present disclosure.

FIG. 1 shows a block diagram illustrating a memory system according to an embodiment of the present disclosure.

The memory system according to an embodiment of the present disclosure includes a memory controller 100 and a memory device 200.

The memory controller 100 receives memory requests and process-in-memory (PIM) requests from the host 10. The memory requests and the PIM requests may be communicated to the memory controller 100 via a common interface. The memory controller may also receive other information associated with the memory requests and PIM requests (such as addresses) via the common interface.

The memory system according to the present embodiment can be connected to the host 10 via a memory bus.

The memory system according to the present embodiment may be provided separately from a main memory device connected to a memory bus, and the memory system may be connected to the host 10 via a separate interface such as a PCI Express (PCIe) interface.

In this way, the host 10 can provide the memory requests and the PIM requests to the memory system via a common interface.

Memory controller 100 generates memory commands and PIM commands from memory requests and PIM requests, and provides the memory commands and PIM commands to the memory device 200 via the same controller-to-memory interface. In an embodiment, the controller-to-memory interface may be an interface according to a memory standard, such as the JEDEC JESD79-4 Double Data Rate 4 Synchronous DRAM (DDR4 SDRAM) standard, JEDEC JESD235B HIGH BANDWIDTH MEMORY (HBM) DRAM standard, and the like.

The memory controller 100 schedules a memory command and a PIM command together and provides them to the memory device 200, which operates such that a memory command and a PIM command can be processed using the same states and transitions of a state machine controlling the memory device 200, as detailed below.

Accordingly, the memory system according to an embodiment does not require a separate interface for a PIM command.

In an embodiment, the host 10 may provide a PIM Instruction to the memory controller 100 instead of a PIM request. A PIM instruction corresponds to an operation that may be performed via one or more PIM requests.

The PIM instruction may be generated in response to a specific software code requiring a PIM operation and may be provided from the host 10.

In an embodiment, a PIM instruction may be preprocessed through a software library into one or more PIM requests, and the host 10 may provide the one or more PIM requests to the memory controller 100 instead of the PIM instruction.

In an embodiment wherein the host 10 provides a PIM Instruction directly to the memory controller 100, rather than a PIM request, the memory system receives the PIM instruction and internally decodes the PIM instruction into one or more PIM requests.

Figure 2:
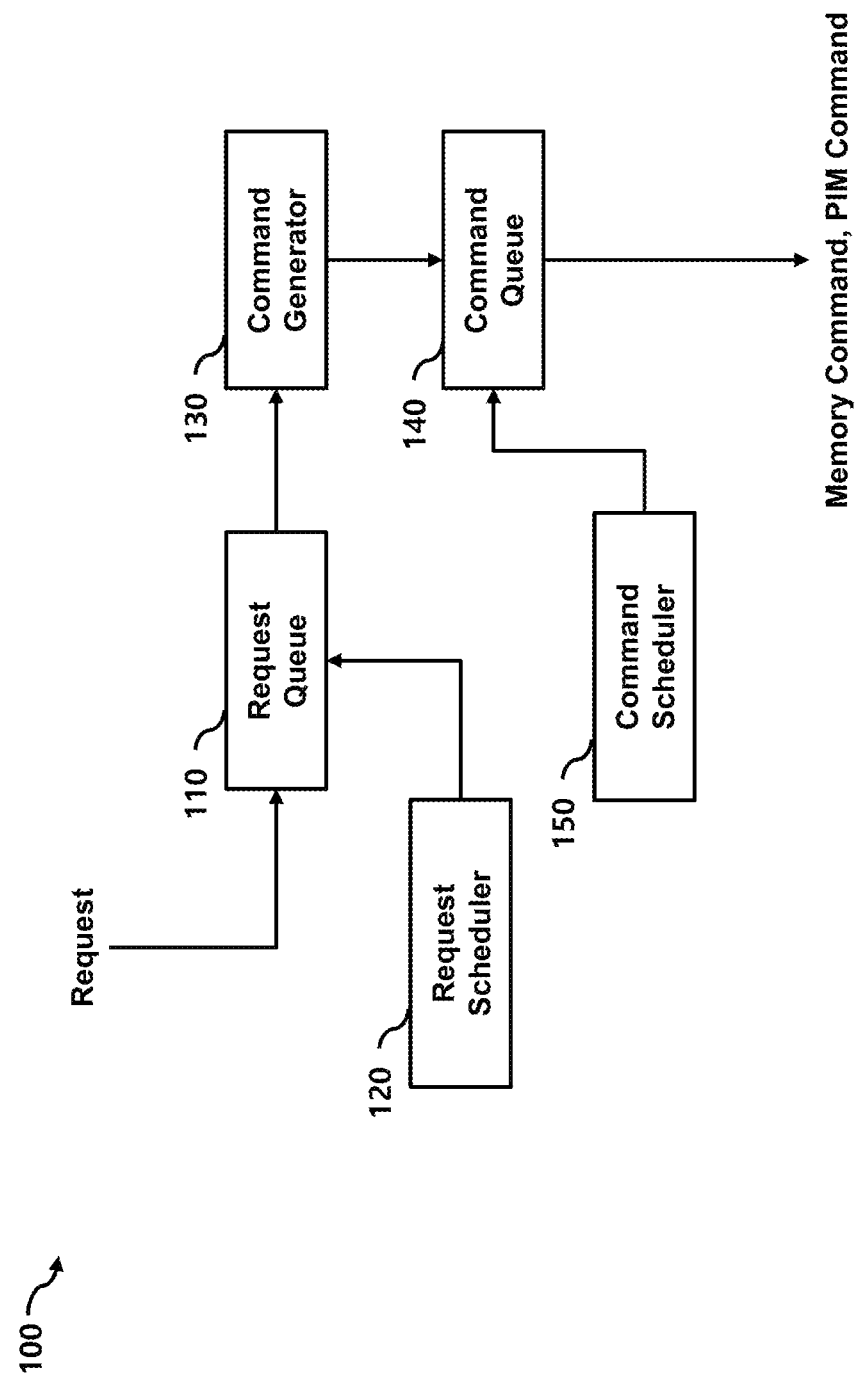
FIG. 2 illustrates a memory controller according to an embodiment of the present disclosure.

FIG. 2 shows a block diagram illustrating the memory controller 100 according to an embodiment of the present disclosure.

FIG. 2 corresponds to an embodiment wherein the host 10 provides requests to the memory controller 100. The requests include memory requests and PIM requests.

The memory controller 100 includes a request queue 110, a request scheduler 120, a command generator 130, a command queue 140, and a command scheduler 150.

Memory requests and PIM requests provided by the host 10 are stored as requests in the request queue 110. Other information associated with a request (e.g., an address and/or data associated with a request) may be stored with the request in the request queue 110.

The request scheduler 120 determines the processing order of the requests stored in the request queue 110.

A memory request may include a memory read request or a memory write request. A memory read request may have an associated address, and a memory write request may have an associated address and associated data.

A PIM request is a request requiring a processing operation, and in an embodiment may include a PIM read request or a PIM write request.

A request may include a special bit (a PIM bit) to distinguish a memory request from a PIM request.

For example, a request may be determined to be a memory request if the PIM bit is 0 and may be determined to be a PIM request if the PIM bit is 1.

The memory controller 100 may also insert a PIM bit in a corresponding command generated from a memory request or a PIM request and provide the corresponding command to the memory device 200.

The request scheduler 120 may apply various scheduling techniques such as First-Come-First-Served (FCFS) and First-Read-First-Come-First-Served (FR-FCFS) to schedule requests stored in the request queue 110 and may provide a selected request to the command generator 130.

The command generator 130 receives a request from the request queue 110. When the request is a memory request, the command generator 130 converts the memory request into one or more memory commands and stores the memory commands into the command queue 140. When the request is a PIM request, the command generator 130 converts the PIM request into one or more PIM commands and stores the PIM commands into the command queue 140.

The command scheduler 150 selects and outputs memory commands and PIM commands stored in the command queue 140 to the memory device 200 in consideration of timing constraints necessary for operation of the memory device 200.

The timing constraint is predefined through standards or the like, and a detailed description thereof will be omitted.

In an embodiment, the command scheduler 150 may consider additional constraints in addition to the timing constraints.

As will be described in detail below, the memory device 200 according to an embodiment includes a plurality of banks and a plurality of processing circuits, and the plurality of banks and the plurality of processing circuits may exchange data via a shared bus (SBUS).

Thus, in an embodiment, the command scheduler 150 may schedule memory commands and PIM commands by further considering the state of the shared bus to prevent data conflicts on the shared bus.

In an embodiment, the command scheduler 150 may schedule memory commands and PIM commands per each bank and provide them to the memory device 200.

Figure 3:
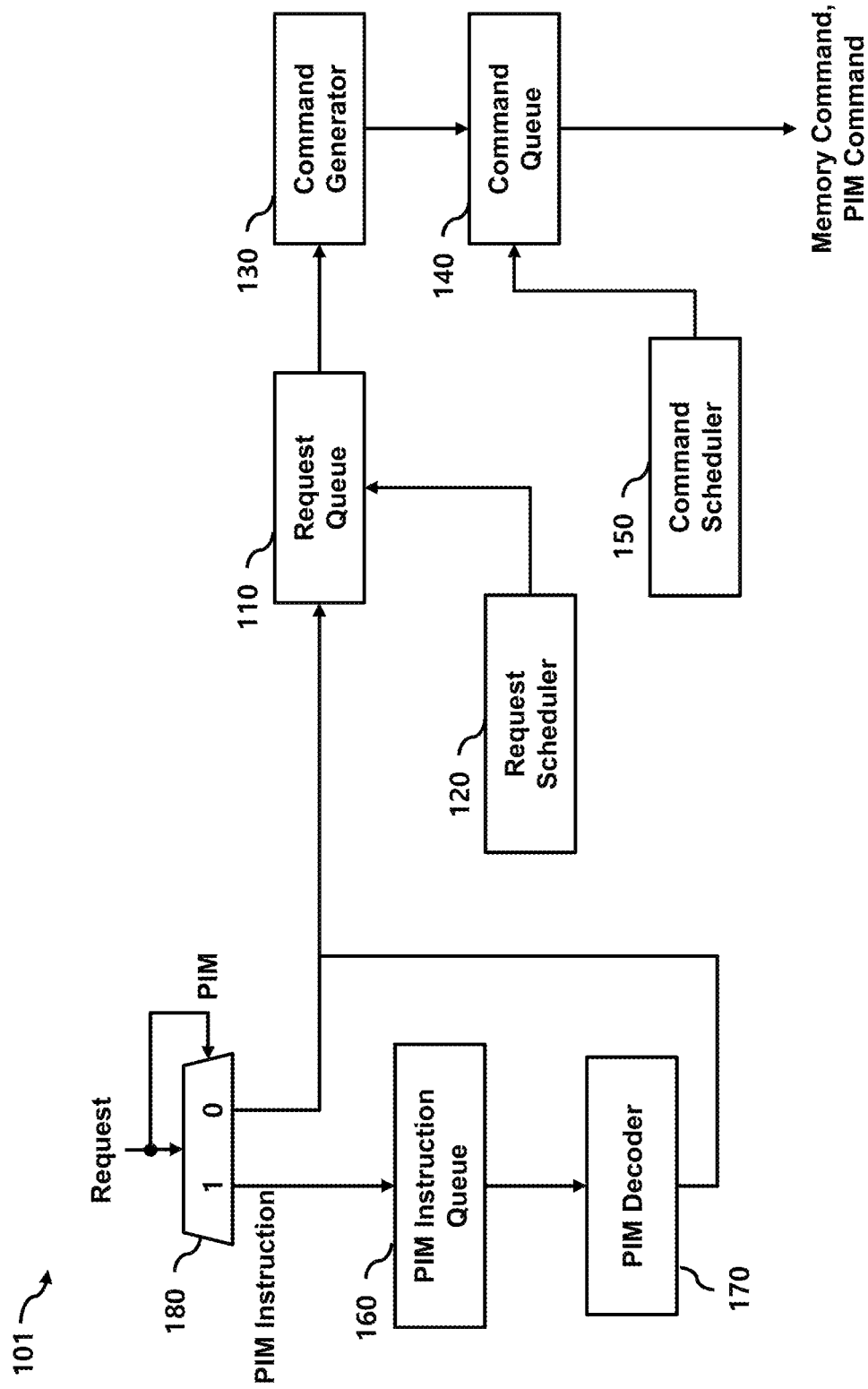
FIG. 3 illustrates a memory controller according to another embodiment of the present disclosure.

FIG. 3 illustrates a memory controller 101 according to another embodiment of the present disclosure.

FIG. 3 corresponds to an embodiment where the host 10 provides a PIM instruction instead of a PIM request to the memory controller 101.

Accordingly, in addition to the components included in the memory controller 100 of FIG. 2, the memory controller 101 further includes a PIM instruction queue 160 for storing PIM instructions and a PIM decoder 170 for converting a PIM instruction into one or more PIM requests.

The host 10 may generate a write request including contents of a PIM instruction in write data and send the write request and the write data to the memory controller 101.

For convenience, a write request with write data that includes contents of the PIM Instruction may be referred to as a PIM instruction.

In embodiments, a PIM bit is included in the write request to distinguish a write request including a PIM instruction from a general write request.

In such an embodiment, write data included in a write request whose PIM bit is set to 1 may be regarded as a PIM instruction and stored in the PIM instruction queue 160.

A memory request with a PIM bit set to 0 may be regarded as a general memory request and stored directly in the request queue 110.

For this purpose, a path selection circuit 180 to determine an output direction for requests according to the PIM bit of the request may be included in the memory controller 101.

The PIM decoder 170 generates one or more of PIM requests corresponding to a PIM instruction. The PIM requests generated by the PIM decoder 170 are queued in the request queue 110.

The PIM decoder 170 may perform a part or all of the operations performed by above-described software library. Specific decoding rules may be predetermined according to embodiments and therefore description about specific decoding operations will be omitted.

Operations of the request queue 110, the request scheduler 120, the command generator 130, the command scheduler 150 and the command queue 140 are substantially the same as described with reference to FIG. 2.

Figures 4A, 4B:
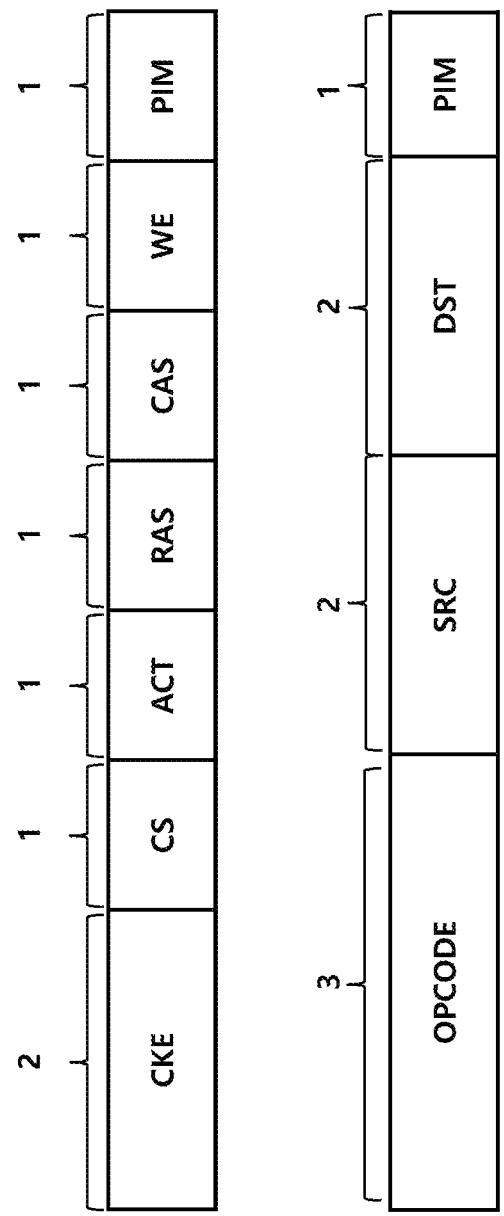
FIGS. 4A and 4B show data structures of a memory command and a PIM command, respectively, according to an embodiment of the present disclosure.

FIG. 4A shows data structure of a memory command according to an embodiment, and FIG. 4B shows data structure of a PIM command according to an embodiment. The memory command and PIM command may be communicated from a memory controller to a memory device via a common interface. In an embodiment, the interface may be signals according to a memory standard; for example, the memory command and PIM command may both be communicated over the CKE, CKE1/C0, CS_n, ACT, RAS_n, CAS_n, WE, and CS1_n/C1 signals of the JESD79-4 DDR4 SDRAM standard, but embodiments are not limited thereto.

The memory command shown in FIG. 4A further includes a PIM bit to a conventional memory command.

In this embodiment, a PIM bit corresponding to a memory command is set to zero.

The conventional memory command includes a total of 7 bits including a 2-bit Clock Enable (CKE) field, a 1-bit Chip Select (CS) field, a 1-bit Activate Command Input (ACT) field, a 1-bit Row Address Strobe (RAS) field, a 1-bit Column Address Strobe (CAS) field, and a 1-bit Write Enable (WE) field.

The command decoder in the memory device 200 decodes a memory command in accordance with predetermined rules to control the internal elements of the memory device 200.

The meaning of each field of the memory command and the technique of decoding them are well-known, and a detailed description thereof will be omitted.

A PIM command shown in FIG. 4B has as same number of bits as a memory command, and a PIM bit of a PIM command is set to 1.

In this embodiment, a PIM command includes a 3-bit OPCODE field, and a 2-bit SRC field and a 2-bit DST field.

The OPCODE field is used to distinguish types of a PIM command and a specific operation of each type.

The SRC field and the DST field can be used to indicate the source and destination of data during a PIM operation.

The memory device 200 may further refer to an address provided to the memory device 200 in association with a PIM command in the same manner as the memory device 200 refers to an address provided to the memory device 200 in association with a memory command. The address may be provided to the memory device over different signals than those used to communicate the memory or PIM command, over the same signals as those used to communicate the memory or PIM command by using time multiplexing, or a combination thereof. For example, in an embodiment, addresses may be provided to the memory device as prescribed by a memory standard such as the JESD79-4 DDR4 SDRAM standard, but embodiments are not limited thereto.

In this embodiment, a PIM command is generated so as to have the same number of bits as a memory command.

In this embodiment, the 7-bit signal except the PIM bit in a memory command and a PIM command can be transmitted to the memory device 200 via a command bus in a conventional manner.

In such an embodiment, the PIM bit may be transmitted between the memory controller 100 and the memory device 200 using a pad unused during transmission of a command signal.

For example, a PIM bit can be transmitted via a data pad or an address pad that would otherwise be unused during transmission of a command.

In another embodiment, a separate pad may be added to the memory controller 100 and memory device 200 to communicate the PIM bit.

In another embodiment, a total of 8 bits including a PIM bit may be encoded into a signal of less than or equal to 7 bits, and the signal of less than or equal to 7 bits transmitted through a conventional command bus.

The memory device 200 receiving the encoded command signal can decode the encoded command signal and generate a memory command or a PIM command, and then decode each command and control internal elements accordingly.

The controller-to-memory interface for transmitting memory commands and PIM commands to the memory device can be variously modified.

Generally, a memory command corresponds to an operation of transmitting or receiving data between a bank and an Input/Output (IO) buffer.

In an embodiment, a PIM command corresponds to an operation of transmitting or receiving data between a bank or the shared bus and a processing circuit.

In such an embodiment, a PIM command may designate a specific operation which may be performed by a processing circuit.

In an embodiment, a first PIM operation includes a memory read operation, and accordingly, the first PIM operation may be handled by the memory device 200 in a manner similar to a memory read operation with a longer latency. A second PIM operation includes a memory write operation, and the second PIM operation may be handled by the memory device 200 in a manner similar to a memory write operation.

FIG. 5 shows a table illustrating PIM commands according to an embodiment of the present disclosure. In FIG. 5, a value of "X" indicates a reserved or "don't care" value.

Types of PIM commands shown in the table of FIG. 5 may be defined pursuant to the design and internal structure of the processing circuit 300 included in the memory device 200. The internal structure of the processing circuit 300 will be described later in detail.

The PIM commands include PIM read commands (PIM RD) and PIM write commands (PIM WR). A specific PIM command is indicated by the opcode field.

In an embodiment, the PIM read commands include four operation commands: a PIM read operation command PRD, a PIM clear operation command CLR, a PIM processing operation command MAC, and a PIM reduction operation command RADD.

The PIM read operation command PRD is indicated by "010" in the OPCODE field, and stores data of the bank or from the shared bus (SBUS) into either a 0th buffer (BUF0) or a 1st buffer (BUF1).

Storing data from the a bank is indicated by "00" in the SRC field, and storing data from the shared busby "01" in the SRC field. Storing the data into the BUF0 is indicated by "10" in the DST field, and storing the data into the BUF1 is indicated by "11" in the DST field.

The BUF0 and the BUF1 are included in the processing circuit 300, the bank is a bank respectively associated with the processing circuit performing the command, and the shared bus is a data bus commonly connected to a plurality of banks and an IO buffer, and these are specifically described below.

The PIM clear operation command CLR is indicated by "000" in the OPCODE field, and each bit in the following four bits correspond to BUF0, BUF1, vACC, and rACC respectively. Elements corresponding to activated bits in those four bits are reset by the clear operation.

vACC is an accumulator that accumulates a result of a vector operation and rACC is an accumulator that accumulates a result of a scalar operation. Hereinafter, vACC may be referred to as a first accumulator, and rACC may be referred to as a second accumulator.

The PIM processing operation command MAC is indicated by "100" In the OPCODE field, and information corresponding to the SRC field and the DST field is not used.

In the PIM processing operation, each value of an element of the vACC is accumulated with a multiplication of corresponding elements of BUF0 and BUF1. For example, in an embodiment vACC, BUF0, and BUF1 way each include 16 8-bit data elements, the PIM processing operation may perform, for i=1 to 16, vACC[i]←vACC[i]+BUF0[i]×BUF1[i], wherein vACC[i], BUF0[i], and BUF1[i] respectively indicate $i^{th}$ bytes of vACC, BUF0, and BUF1.

The PIM reduction operation command RADD is indicated by "110" in the OPCODE field and the information in the DST field is not used.

The reduction operation is subdivided into two operations according to information of the SRC field. The first reduction operation is performed when the SRC field is "0X", which corresponds to adding all the elements of vACC and storing the result in the rACC. For example, in the embodiment above where vACC includes 16 8-bit data elements, the PIM reduction operation may perform rACC[i]←vACC[1]+vACC[2]+ . . . +vACC[15]+vACC[16] when the SRC field is "0X", wherein rACC[i] indicates a value within the rACC selected using address information associated with the PIM reduction operation command RADD.

The second reduction operation is performed when the SRC field is "1X", which corresponds to accumulating a value of rACC with a value provided to the shared bus. For example, in an embodiment wherein the SBUS includes 128 bits conceptually divided into 16 8-bit data elements, the second reduction operation may select a $j^{th}$ byte SBUS[j] of the SBUS according to address information associated with the PIM reduction operation command RADD, and may perform rACC[i]←rACC[i]+SBUS[j], wherein rACC[i] indicates a value within the rACC selected using address information associated with the PIM reduction operation command RADD.

In an embodiment, PIM write commands are indicated by "001" in the OPCODE field and includes a PIM write operation command PWR.

The PIM write operation is an operation of copying data of the vACC or rACC to a bank or onto the shared bus.

Copying data to a bank is indicated by "00" in the DST field, and to the shared bus indicated by "01" in the DST field. Copying data from the vACC is indicated by "10" in the SRC field, and from the rACC indicated by "11" in the SRC field.

Figure 6:
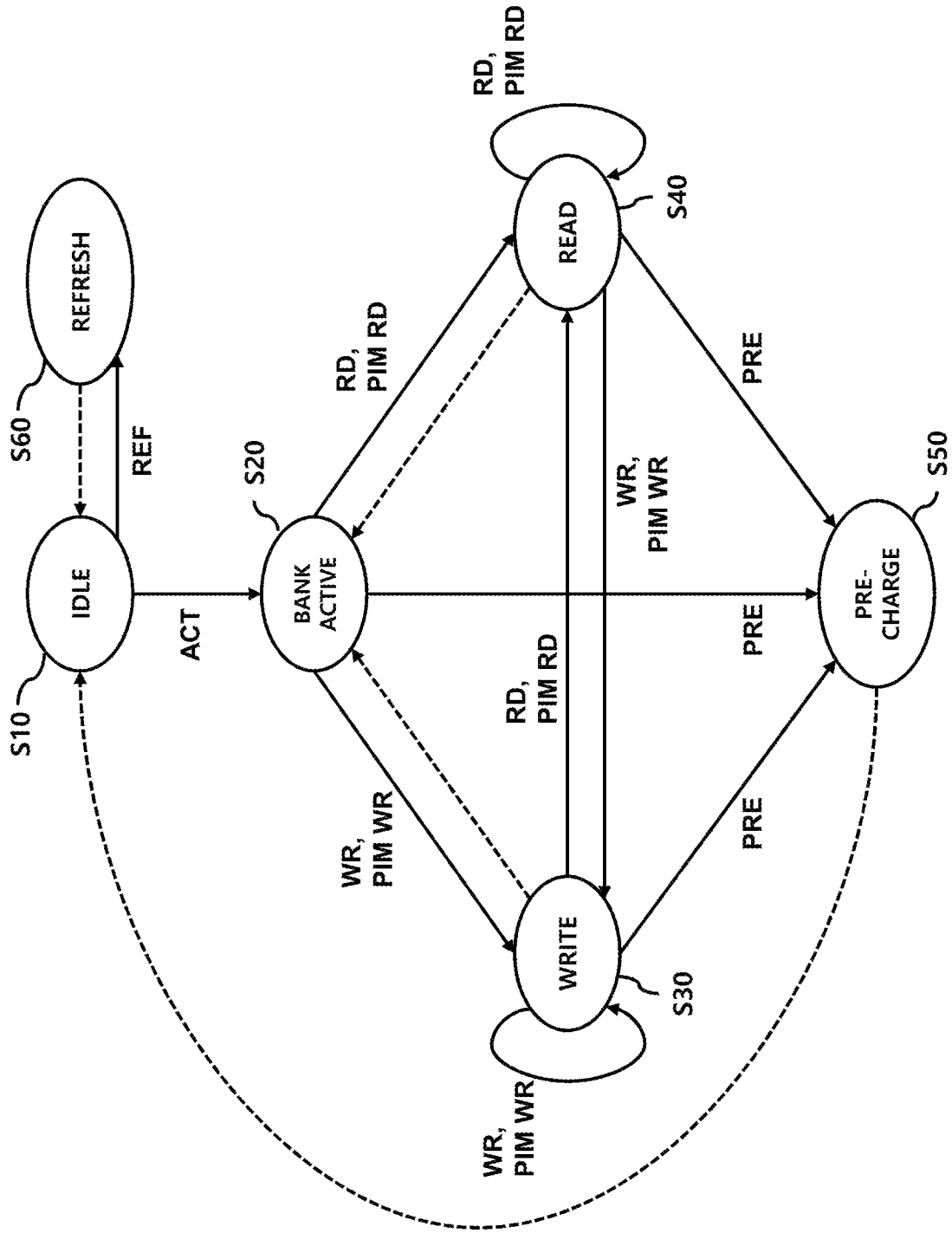
FIG. 6 shows a state diagram illustrating operation of a memory device according to an embodiment of the present disclosure.

FIG. 6 shows a state diagram 600 illustrating an operation of a state machine in a memory device 200 according to an embodiment of the present disclosure.

The state diagram 600 of FIG. 6 is in many respects the same as a corresponding state diagram for a conventional Dynamic Random Access Memory (DRAM).

In an embodiment, the state machine corresponding to the state machine 600 changes states in response to a PIM read command (PIM RD) and a PIM write command (PIM WR), which are PIM commands, as well as changing states in response to a read command (RD), a write command (RD), an Activate command (AC), a Precharge command (PRE), and a Refresh command (REF) which are conventional DRAM commands.

States of the state diagram 600 include an idle state S10, a bank active state S20, a write state S30, a read state S40, a precharge state S50, and a refresh state S60.

When the Activate command ACT is input in the idle state S10, the state transitions to the bank active state S20, and in an embodiment a row of a bank determined according to an address associated with the Activate command is placed in the activated state, so that data can be read from and written to that row. When the refresh command REF is input in the idle state S10, the state transitions to the refresh state S60.

When the write command WR or PIM write command PIM WR is input in the bank active state S20, the state transitions to the write state S30. When the read command RD or the PIM read command PIM RD is input in the bank active state S20, the state transitions to the read state S40. When the precharge command PRE is input in the bank active state S20, the state transitions to the precharge state S50.

When the write command WR or PIM write command PIM WR is input in the write state S30, the write state S30 is maintained. When the read command RD or the PIM read command is input in the write state S30, the state transitions to the read state S40. When the precharge command PRE is input in the write state S30, the state transitions to the precharge state S50. When the write operation is completed without receiving another command in the write state S30, the state transitions to the bank active state S20. Whenever the state machine transitions to or remains in the write state S30 in response to a command, data may be written to the active row in the bank, to the shared bus SBUS, or neither, depending on the command.

When the write command WR or PIM write command PIM WR is input in the read state S40, the state transitions to the write state S30. When the read command RD or PIM read command PIM RD is input in the read state S40, the read state S40 is maintained. When the precharge command PRE is input in the read state S40, the state transitions to the precharge state S50. When the write operation is completed without receiving another command in the read state S40, the state transitions to the bank active state S20. Whenever the state machine transitions to or remains in the read state S40 in response to a command, data may be read from the active row in the bank, from the shared bus SBUS, or neither, depending on the command.

When the precharge operation terminates in the precharge state S50, the state transitions to the idle state S10. When the refresh operation terminates in the refresh state S60, the state transitions to the idle state S10. Whenever the state machine transitions to the precharge state S50, the active row in the bank is deactivated.

As shown in FIG. 6, memory commands and PIM commands are processed by the state machine corresponding to the state diagram 600 in the same way, which has the following advantages.

First, it is possible to prevent the processing of a memory command from being unconditionally interrupted by the processing of a PIM command. Accordingly, since a memory command can be scheduled and processed while a collision does not occur during processing of a PIM command, performance degradation of a memory system can be prevented.

Second, since a common state diagram is used, memory commands and PIM commands can be processed in a single command queue. Accordingly, further elements required for processing a PIM command separate from a memory command may not be included in a memory controller and a memory device, thereby simplifying a memory system.

Figure 7:
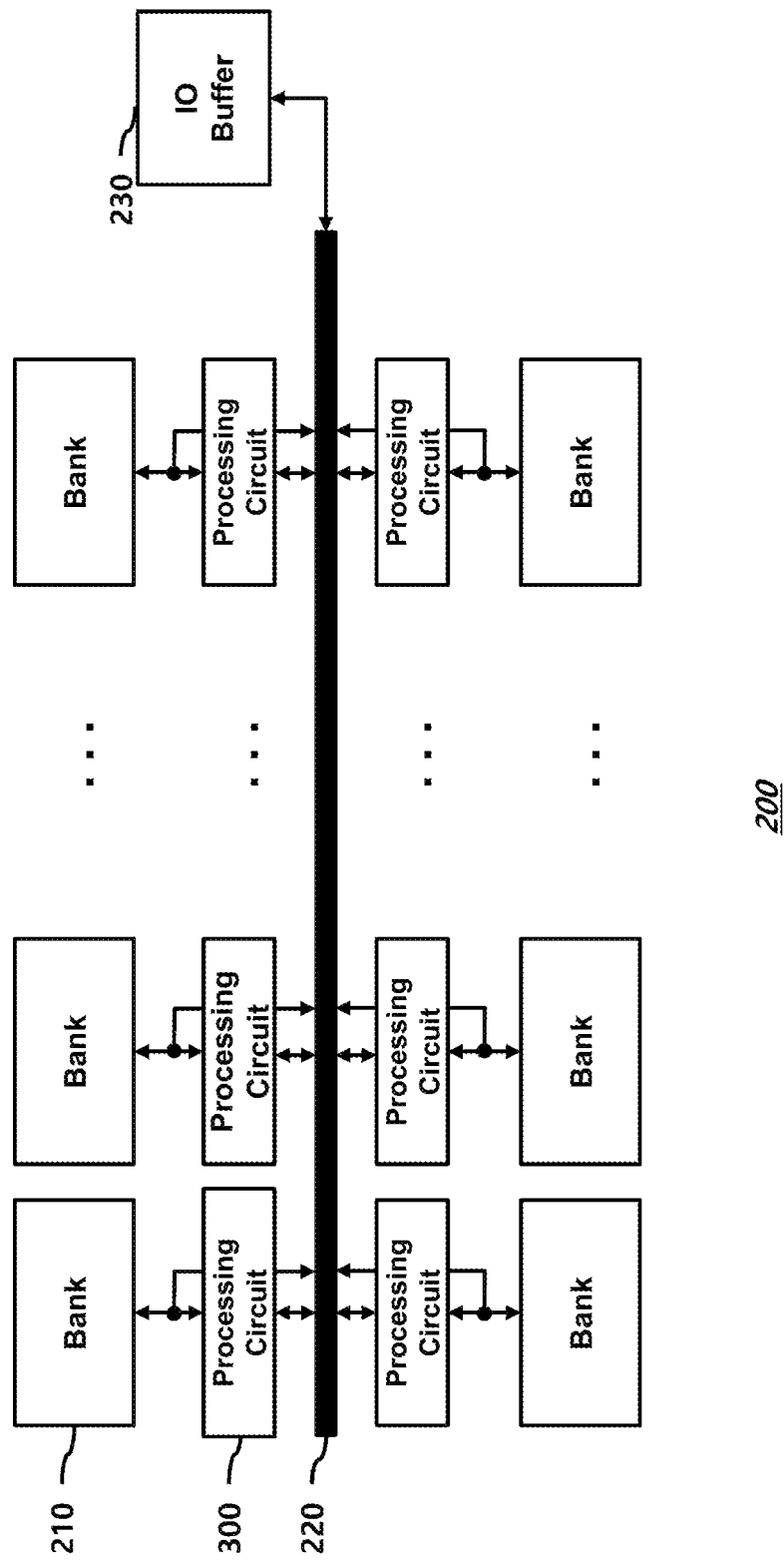
FIG. 7 illustrates a memory device according to an embodiment of the present disclosure.

FIG. 7 show a block diagram illustrating portions of a memory device 200 according to an embodiment of the present disclosure.

The memory device 200 according to the present embodiment includes a plurality of banks 210, a plurality of processing circuits 300, a shared bus 220, and an IO buffer 230. In an embodiment, the memory device 200 may further include one or more command decoder circuits (not shown) as described with respect to FIG. 8. A command decoder may be included for and associated with each combination of a bank 210 and a processing circuit 300.

In an embodiment, the number of banks and processing circuits may be 16 and one bank 210 corresponds to one processing circuit 300, but embodiments are not limited thereto.

The relationship between banks 210 and processing circuits 300 can be variously changed in consideration of address mapping or parallel processing. For example, in an embodiment, each processing circuit 300 may be provided with and coupled to a corresponding plurality of banks 210.

The shared bus 220 transfers data between the bank 210, the processing circuit 300 and the IO buffer 230.

The processing circuit 300 can perform a processing operation using data of a corresponding bank 210 or using data of another bank or another processing circuit transferred through the shared bus 220. In an embodiment, each processing circuit 300 and its associated bank 210 receive and process commands independently, the commands including PIM commands and memory commands. In an embodiment, each processing circuit 300 and its associated bank 210 may simultaneously receive and process commands different from the commands being received and processed by other processing circuits 300 and its associated banks 210.

Figure 8:
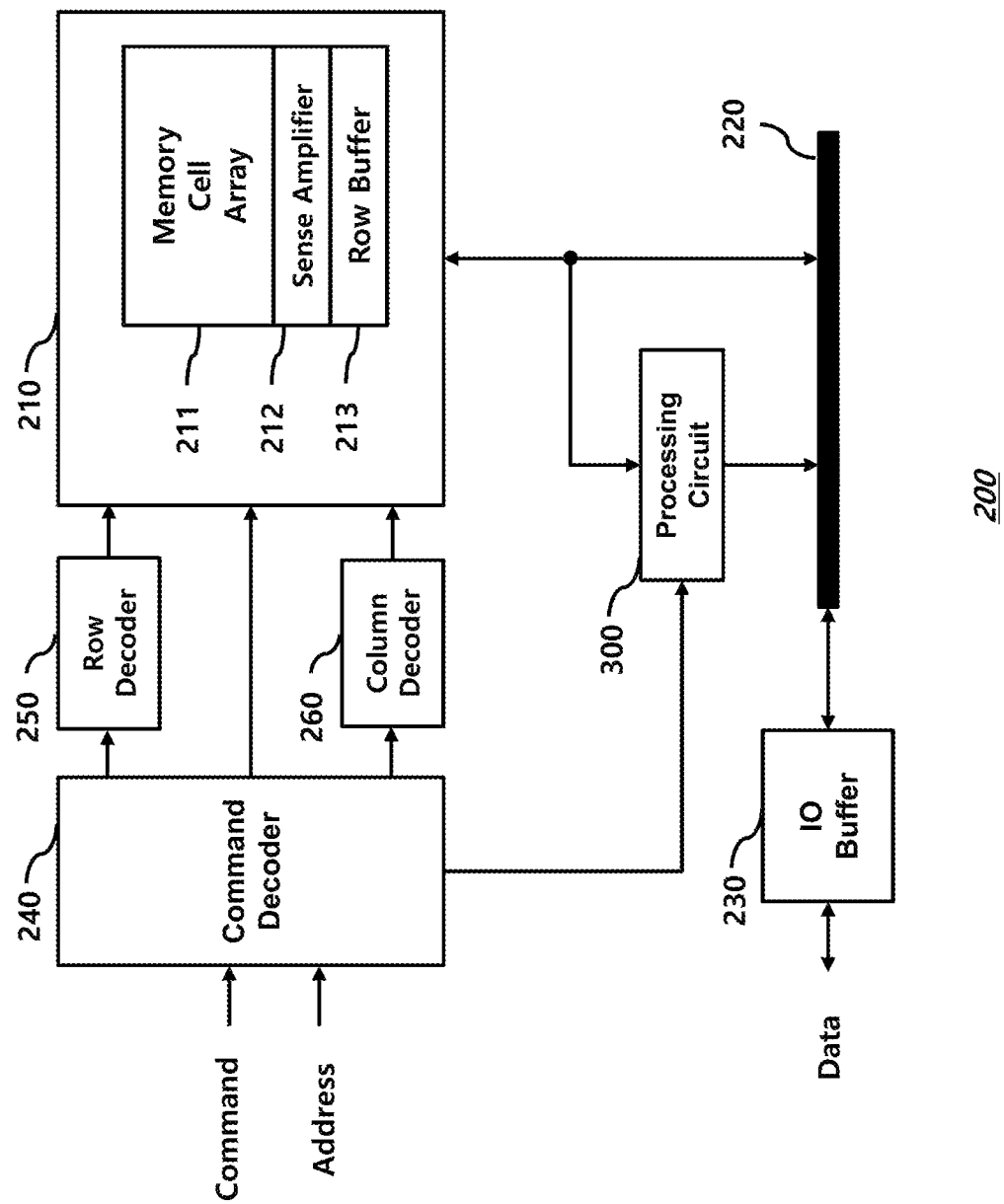
FIG. 8 illustrates a portion of a memory device according to an embodiment of the present disclosure.

FIG. 8 shows a block diagram illustrating a memory device 200 according to another embodiment of the present disclosure.

As described above, the memory device 200 includes a bank 210, a shared bus 220, and an IO buffer 230.

The bank 210 includes a memory cell array 211, a sense amplifier 212 and a row buffer 213, whose detailed configuration and operation are substantially as same as those in the conventional memory device, and are therefore omitted in the interest of brevity.

Although one bank 210 is shown in FIG. 8, the memory device 200 may Include a plurality of banks each having the same structure.

The memory device 200 further includes a command decoder 240, a row decoder 250, and a column decoder 260.

The basic operations of the command decoder 240, the row decoder 250 and the column decoder 260 are the same as those of a conventional memory device, except as noted below.

The command decoder 240 further decodes a PIM command provided through the command signal, as well as decoding a memory command provided through the command signal, and controls the bank 210, the row decoder 250, the column decoder 260, the shared bus 220, the processing circuit 300, and the IO buffer 230.

In FIG. 8, a command includes a memory command or a PIM command.

The command decoder 240 refers to a PIM bit to identify whether a command is a memory command or a PIM command and to control other elements included in the memory device 200.

When the Identified command is a memory command, it may use a conventional decoding technique to control other elements included in the memory device 200.

If the identified command is a PIM command, it further controls other elements included in the memory device 200 to perform operations as illustrated in the table of FIG. 5.

The state transitions of the memory device 200 according to a memory command and a PIM command have been described above with reference to the state diagram of FIG. 6.

The processing circuit 300 reads information of the bank 210 or the shared bus 220 to perform a specified operation and writes result of the operation to the bank 210 or the shared bus 220.

In the present embodiment, it is assumed that the processing circuit 300 performs a multiplication operation of a matrix and a vector, but the specific processing operation and the detailed structure of the processing circuit 300 may be variously changed according to embodiments.

Figure 9:
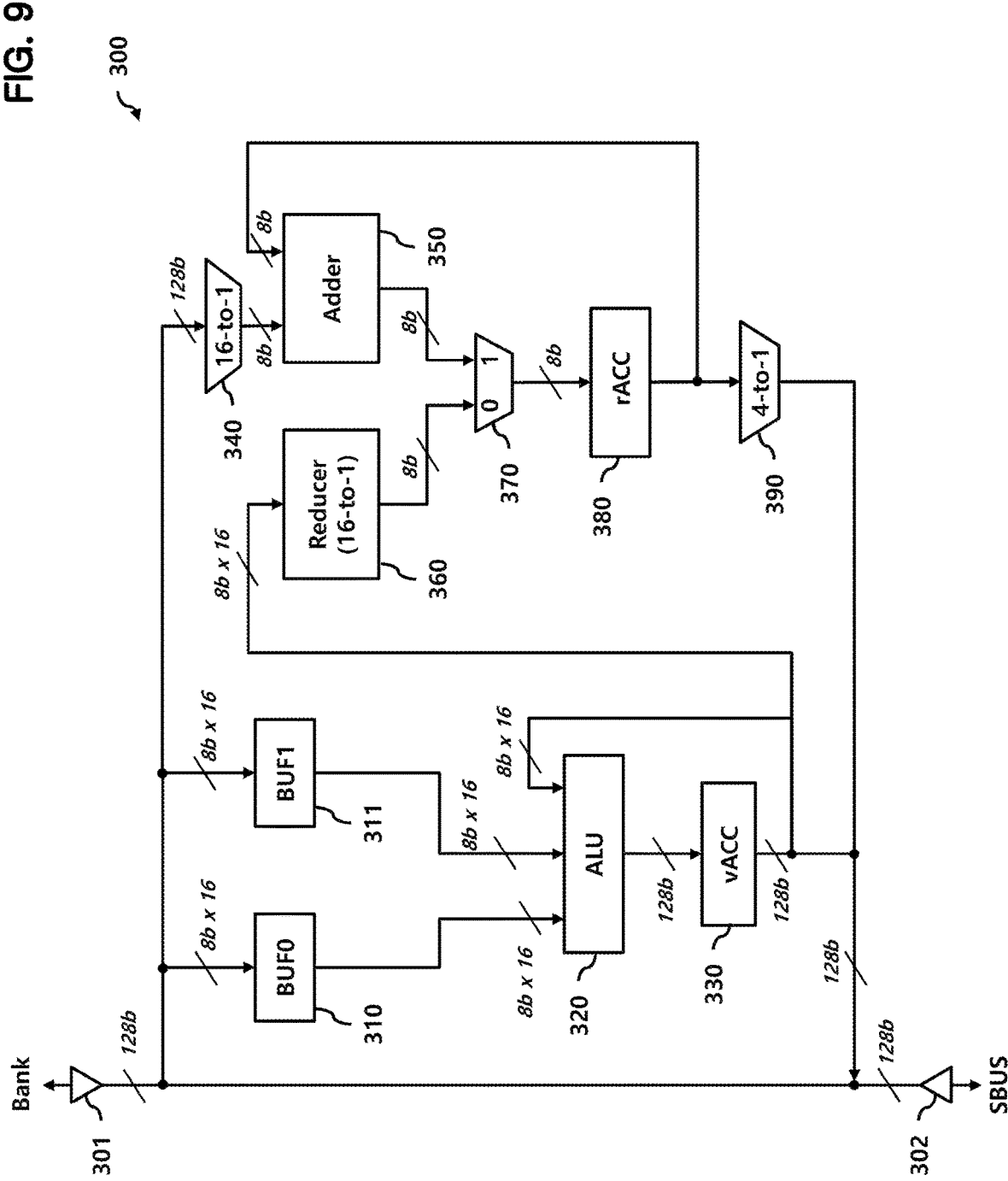
FIG. 9 illustrates a processing circuit according to an embodiment of the present disclosure.

FIG. 9 shows a block diagram illustrating a processing circuit 300 according to an embodiment of the present disclosure.

In this embodiment, data output from each bank 210 is represented by a 128-bit signal, each element of a matrix or a vector is represented by an 8-bit signal, and each row of a matrix or a vector includes 16 elements.

The processing circuit 300 includes a BUF0 310 and a BUF1 311 each storing 128-bit data transferred from the bank 210 or from the shared bus 220.

The processing circuit 300 may further include latches for storing data of BUF0 310 and BUF1 311 for pipeline operation.

128-bit data includes 16 8-bit data elements each corresponding to an element of a vector or a matrix.

The processing circuit 300 further includes an ALU 320 and a vACC 330.

The ALU 320 and vACC 330 perform element-by-element multiplication operations on 16 8-bit data elements stored in the BUF0 310 and the BUF1 311, and accumulates results of the multiplication operations to data stored in the vACC 330.

That is, the ALU 320 performs multiplication operation on elements stored in the BUF0 310 and the BUF1 311 and accumulates multiplication result to a value stored in the vACC 330.

For example, the i-th element among the 16 elements stored in the BUF0 310 is multiplied by the i-th element stored in the BUF1 311 and the multiplication result is accumulated in the i-th element of the vACC 330.

The processing circuit 300 further includes a reducer 360. The reducer 360 adds all 16 8-bit data elements stored in the vACC 330 to generate an 8-bit value.

The processing circuit 300 further includes a first selector 340. The first selector 340 outputs one 8-bit data element among 16 8-bit data elements from the 128-bit data transmitted from a bank 210 or from the shared bus 220.

The first selector 340 can select any one of the data elements using address information that may be provided with the PIM read command from the memory controller 100.

The processing circuit 300 further includes an adder 350 and a rACC 380.

The adder 350 adds the output of the first selector 340 and the value stored in the rACC 380 to update the value of the rACC 380.

The processing circuit 300 further includes a second selector 370. The second selector 370 may be controlled in response to the first bit of the DST field to select the output of the reducer 360 or the output of the adder 350 and provides the selected output of the second selector 370 to the rACC 380.

In this embodiment, the rACC 380 stores 512-bit data. The rACC 380 may store up to four 128-bit data to support burst write function.

For example, in FIG. 5, the output of the reducer 360 is selected when the DST field is "0X" and the output of the adder 250 is selected when the DST field is "1X" during the reduction operation.

The processing circuit 300 further includes a third selector 390 and the third selector 390 selects one of four 128-bit data among the 512-bit data stored in the rACC 380.

At this time, the third selector 390 can select one of the four 128-bit data from the address that may be provided with the PIM write command.

The four 128-bit data stored in the rACC 380 may be sequentially selected in the burst write operation and sequentially stored from an address of the destination.

The processing circuit 300 further Includes a first tri-state buffer 301 connected to the bank 210 and a second tri-state buffer 302 connected to the shared bus 220 to prevent data collision. The first tri-state buffer 301 and the second tri-state buffer 302 may be bidirectional, so that data may be transferred to or from the bank through the first tri-state buffer 301, and to or from the shared bus SBUS through the second tri-state buffer 302.

FIG. 10 shows a diagram illustrating a PIM operation according to an embodiment of the present disclosure.

The first operation corresponds to a PIM RD command and specifically to a clear operation command CLR which clears BUF0 310, BUF1 311, vACC 330, and rACC 380 according to bit information specified in the SRC and DST fields.

The second operation corresponds to a PIM RD command and specifically to a read operation command PRD for reading a first operand from a bank 210 and for storing the first operand to BUF0 310. An ACT command (not shown) may have preceded the PIM operation shown in FIG. 10 to permit data to be read from and written to an activated row of the bank 210.

The third operation corresponds to a PIM RD command and specifically to a read operation command PRD for reading a second operand from a bank 210 and for storing the second operand to BUF1 311.

The fourth operation corresponds to a PIM RD command and specifically to a processing operation command MAC for multiplying corresponding elements of BUF0 310 and BUF1 311 and for accumulating into elements of vACC 330 the corresponding multiplication results.

In the present embodiment, the memory controller 100 may not send a command for the fourth operation. Instead, the command decoder 240 of the memory device 200 may control elements of the memory device 200 to automatically perform the fourth operation after the second and the third operations are performed.

For example, if it is assumed that the second to the fourth operations are repeatedly performed, the fourth operation may be parallelly performed while the second operation and the third operation for the next loop are performed, thereby improving processing performance.

The fifth operation corresponds to a PIM RD command and specifically to a reduction operation command RADD for adding elements of the vACC 330 and for storing the result to the rACC 380.

The operation of adding elements of the vACC 330 may be performed in the reducer 360 and the result is stored in the rACC 380 via the second selector 370.

The sixth operation corresponds to a PIM WR command and specifically to a write operation command PWR for storing data from rACC 380 to the shared bus 220.

The sixth operation may be performed to provide data output from a processing circuit 300 to another processing circuit 300 or another bank 210.

FIG. 11 shows a diagram illustrating another PIM operation according to an embodiment of the present disclosure.

FIG. 11 further includes seventh operation between the fifth operation and the sixth operation in FIG. 10.

The seventh operation corresponds to a PIM RD command and specifically to a reduction operation command RADD which selects data from the shared bus 220 to update data of rACC 380.

The data on the shared bus 220 may be data provided from another bank or another processing circuits that are not associated with the current processing circuit 300.

FIG. 12 shows a diagram illustrating another PIM operation according to an embodiment of the present disclosure.

FIG. 12 includes the eighth operation instead of the sixth operation of FIG. 11.

The eighth operation corresponds to a PIM WR command and specifically to a write operation command PWR for writing data of rACC 380 to a bank 210.

Although various embodiments have been described for illustrative purposes, it will be apparent to those skilled in the art that various changes and modifications may be made to the described embodiments without departing from the spirit and scope of the disclosure as defined by the following claims.

What is claimed is:

1. A memory controller comprising:
a request queue configured to store one or more requests, each request including a memory request or a Process In Memory (PIM) request, the memory request including a read request to a memory device or a write request to the memory device, and the PIM request requiring a processing operation in the memory device;
a command generator configured to receive a request from the request queue, to generate a memory command when the received request includes a memory request, and to generate a PIM command when the received request includes a PIM request;
a command queue configured to store memory commands and PIM commands generated by the command generator; and
a command scheduler configured to control an output order or an output timing of the memory commands and the PIM commands stored in the command queue,
wherein the memory command and the PIM command each include information to identify kinds of a command,
wherein the PIM command includes an OPCODE field indicating an operation to be performed in the memory device, a SRC field indicating a source of data in the memory device; and
a DST field indicating a destination of data in the memory device,
wherein the PIM command includes a PIM read command or a PIM write command,
wherein the PIM read command includes a read operation command to read data from a place designated by the SRC field and write the data to a place designated by the DST field and a processing operation command indicating a processing operation to be performed on the data, and
wherein the PIM write command includes a write operation command to read data from a place designated by the SRC field and write the data to a place designated by the DST field.

2. The memory controller of claim 1, further comprising a request scheduler configured to control an output order of the requests stored in the request queue.

3. The memory controller of claim 1, wherein the command scheduler controls the output order and the output timing according to timing constraints of the memory device, a state of a shared bus in the memory device, or both.

4. The memory controller of claim 1, wherein when the PIM command includes a read operation command, the SRC field designates a bank or a shared bus in the memory device and the DST field designates a buffer in the memory device, and
wherein when the PIM command includes a write operation command, the SRC field designates a buffer in the memory device and the DST field designates a bank or a shared bus in the memory device.

5. A memory controller comprising:
a request queue configured to store one or more requests, each request including a memory request or a Process In Memory (PIM) request, the memory request including a read request to a memory device or a write request to the memory device, and the PIM request requiring a processing operation in the memory device;
a command generator configured to receive a request from the request queue, to generate a memory command when the received request includes a memory request, and to generate a PIM command when the received request includes a PIM request;
a command queue configured to store memory commands and PIM commands generated by the command generator;
a command scheduler configured to control an output order or an output timing of the memory commands and the PIM commands stored in the command queue;
a PIM decoder configured to generate a PIM request from a PIM instruction; and
a PIM instruction queue configured to store the PIM instruction,
wherein the PIM instruction is included in write data of a write request and the write request includes PIM information indicating whether a PIM instruction is included in the write request, and
wherein the memory controller further comprises a path selection circuit configured to send the write request to the request queue when the PIM information has a first state and to the PIM instruction queue when the PIM information has a second state.

6. A memory device comprising:
a command decoder configured to decode a command, the command including a memory command or a PIM command, the memory command corresponding to a read or a write operation in the memory device, and the PIM command corresponding to a processing operation in the memory device;
a bank storing data;
an input/output (IO) buffer configured to input data to or output data from the memory device;
a shared bus configured to transfer data between the bank and the IO buffer; and
a processing circuit coupled to the shared bus and to the bank, and configured to perform a processing operation as directed by the command decoder,
wherein the bank is controlled by the command decoder to perform a read or write operation according to a memory command while the processing circuit performs a processing operation according to a PIM command.

7. The memory device of claim 6, wherein the command decoder outputs a control signal to control the memory device by decoding a memory command or a PIM command,
wherein the memory device operates by transitioning between states in response to the control signal; and
wherein the states include a bank active state, a write state, and a read state.

8. The memory device of claim 7, wherein when the memory device is in the bank active state, the write state or the read state:
the memory device maintains or transitions to the write state when the command decoder outputs a write command in response to decoding a memory command or when the command decoder outputs a PIM write command in response to decoding a PIM command, and
wherein the memory device maintains or transitions to the read state when the command decoder outputs a read command in response to decoding a memory command or when the command decoder outputs a PIM read command in response to decoding a PIM command.

9. The memory device of claim 6, wherein the processing circuit comprises:
a plurality of buffers each configured to store data received from the bank or the shared bus;

an ALU configured to perform an arithmetic operation on the data stored in the plurality of buffers; and a first accumulator configured to store an operation result output from the ALU and to provide data to the bank or the shared bus.

10. The memory device of claim 9, wherein the processing circuit further comprises:
a second accumulator configured to provide data to the bank or the shared bus; and
an adder configured to add data from the second accumulator to data provided from the bank or the shared bus.

11. The memory device of claim 10,
wherein each of the plurality of buffers and the first accumulator stores vector data,
wherein the ALU performs a vector operation,
wherein the second accumulator stores scalar data; and
wherein the adder performs scalar addition.

12. The memory device of claim 11, further comprising a reducer configured to add together all elements of a vector data stored in the first accumulator; and a selector configured to select an output of the reducer or an output of the adder and provide the selected output to the second accumulator.

13. The memory device of claim 6, further comprising a plurality of banks and a plurality of processing circuits each corresponding to one of the plurality of banks.

14. A memory system: comprising:
a memory device; and
a memory controller configured to:
receive a request,
generate a memory command from the request when the request includes a memory request, the memory request including a read request or a write request for the memory device,
generate a PIM command from the request when the request includes a PIM request, the PIM request requiring a processing operation in the memory device, and
schedule the PIM command together with the memory command,
wherein the memory device performs a data read operation or a data write operation in response to a memory command from the memory controller and performs a processing operation in response to a PIM command from the memory controller, and
wherein the memory device performs the data read operation or the data write operation while the memory device performs the processing operation.

15. The memory system of claim 14, wherein the memory controller comprises:
a request queue storing the received request including the memory request or the PIM request;
a command generator configured to generate a memory command from a memory request output from the request queue and to generate a PIM command from a PIM request output from the request queue;
a command queue storing a memory command and a PIM command output from the command generator; and
a command scheduler configured to control an output order, an output timing, or both of the memory command and the PIM command stored in the command queue.

16. The memory system of claim 15, wherein the memory controller further comprises a request scheduler configured to control output order of requests stored in the request queue and wherein the command scheduler controls the output order and the output timing according to timing constraints of the memory bus, a state of a shared bus in the memory device, or both.

17. The memory system of claim 14, wherein the memory device comprises:
a command decoder configured to decode a memory command indicating a read or a write operation to be performed in the memory device and to decode a PIM command indicating a processing operation to be performed in the memory device;
a bank configured to store data;
an input/output (IO) buffer configured to input data to or output data from the memory device;
a shared bus configured to transfer data between the bank and the IO buffer; and
a processing circuit coupled with to shared bus and coupled to the bank, and configured to perform a processing operation according to the command decoder,
wherein the bank is controlled by the command decoder to perform a memory operation in response to a memory command while the processing circuit performs a processing operation in response to a PIM command.

18. The memory system of claim 17, wherein the command decoder outputs a control signal to control the memory device by decoding memory commands and a PIM commands,
wherein the memory device operates by transitioning between states in response to the control signal; and
wherein the states include a bank active state, a write state, and a read state.

19. The memory system of claim 17, wherein when the memory device is in the bank active state, the write state or the read state:
the memory device maintains or transitions to the write state when the command decoder outputs a write command in response to decoding a memory command and when the command decoder outputs a PIM write command in response to decoding a PIM command, and
wherein the memory device maintains or transitions to the read state when the command decoder outputs a read command in response to decoding a memory command and when the command decoder outputs a PIM read command in response to decoding a PIM command.

20. The memory system of claim 17, wherein the processing circuit comprises:
a plurality of buffers each configured to store data from the bank or the shared bus;
an ALU configured to perform an arithmetic operation on the data stored in the plurality of buffers; and
a first accumulator configured to store operation result output from the ALU and to provide data to the bank or the shared bus.

21. The memory system of claim 20, wherein the processing circuit further comprises:
a second accumulator configured to provide data to the bank or to the shared bus; and
an adder configured to add data from the second accumulator to data provided from the bank or the shared bus.

22. The memory system of claim 21,
wherein each of the plurality of buffers and the first accumulator stores vector data,
wherein the ALU performs a vector operation,
wherein the second accumulator stores scalar data; and
wherein the adder performs scalar addition.

23. The memory system of claim 22, further comprising a reducer adding together all elements of a vector data stored in the first accumulator; and a selector configured to select an output of the reducer or an output of the adder and to provide the selected output to the second accumulator.

* * * * *